United States Patent
Malignaggi et al.

(10) Patent No.: US 12,425,068 B2
(45) Date of Patent: Sep. 23, 2025

(54) METHOD AND APPARATUS FOR CHANNEL AGGREGATION AND SINGLE SIDEBAND TRANSMISSION

(71) Applicant: IHP GmbH—Innovations for High Performance Microelectronics / Leibniz-Institut für innovative Mikroelektronik, Frankfurt (DE)

(72) Inventors: Andrea Malignaggi, Frankfurt (DE); Christoph Herold, Frankfurt (DE)

(73) Assignee: IHP GMBH—INNOVATIONS FOR HIGH PERFORMANCE MICROELECTRONICS / LEIBNIZ-INSTITUT FÜR INNOVATIVE MIKROELEKTRONIK, Frankfurt (DE)

( * ) Notice: Subject to any disclaimer, the term of this patent is extended or adjusted under 35 U.S.C. 154(b) by 0 days.

(21) Appl. No.: 18/592,006

(22) Filed: Feb. 29, 2024

(65) Prior Publication Data
US 2024/0297681 A1    Sep. 5, 2024

(30) Foreign Application Priority Data
Mar. 1, 2023    (EP) ..................................... 23159486

(51) Int. Cl.
H04B 1/68 (2006.01)
H04B 1/30 (2006.01)
(52) U.S. Cl.
CPC ............... *H04B 1/68* (2013.01); *H04B 1/302* (2013.01)

(58) Field of Classification Search
CPC .................................. H04B 1/68; H04B 1/302
USPC ........................................................ 375/262
See application file for complete search history.

(56) References Cited

FOREIGN PATENT DOCUMENTS

| CN | 119628664 A1 * | 3/2025 |
| EP | 1264424 | 12/2006 |
| EP | 3008819 | 10/2018 |

OTHER PUBLICATIONS

Ahasan et al., "Frequency-Domain-Multiplexing Single-Wave Interface and Harmonic-Rejection-Based IF Data De-Multiplexing in Millimeter-Wave MIMO Arrays," IEEE Journal of Solid-State Circuits, vol. 56, No. 5, May 2021, pp. 1360-1373.
(Continued)

*Primary Examiner* — Dominic D Saltarelli
(74) *Attorney, Agent, or Firm* — Sheridan Ross P.C.

(57) ABSTRACT

A method for channel aggregation and single sideband transmission executed in a broad-band communication system is suggested in which only I and Q versions of a purely sinusoidal local oscillator signals are needed, easing the system scaling when large numbers of channels must be aggregated. In addition to that, instead of phase shifting of an intermediate frequency broadband signal rather two intermediate frequency broadband signals are generated, which are phase shifted by +90° or by −90°. As a result, the problems of frequency dependent phase shifting explained in the background section is not relevant for the method according to the present disclosure. Also, a corresponding method for image reject reception and channel separation as well as a transmitter and receiver for performing the methods are suggested.

8 Claims, 7 Drawing Sheets

(56) References Cited

OTHER PUBLICATIONS

Dascurcu et al., "A 60GHz Phased Array Transceiver Chipset in 45nm RF SOI Featuring Channel Aggregation Using HRM-Based Frequency Interleaving," IEEE Radio Frequency Integrated Circuits Symposium, No. RMo2A-3, 2022, pp. 67-70.
Eissa et al., "Frequency Interleaving IF Transmitter and Receiver for 240-GHz Communication in SiGe:C BiCMOS," IEEE Transactions on Microwave Theory and Techniques, vol. 68, No. 1, Jan. 2020, pp. 238-250.
Extended European Search Report for Europe Patent Application No. 23159486.2, dated Aug. 30, 2023, 8 pages.

* cited by examiner

METHOD AND APPARATUS FOR CHANNEL AGGREGATION AND SINGLE SIDEBAND TRANSMISSION

CROSS-REFERENCE TO RELATED APPLICATION

This application claims the benefit of European Patent Application No. 23159486.2 filed Mar. 1, 2023, the entire contents of which are incorporated herein by reference in its entirety.

TECHNICAL FIELD

The present disclosure relates to an apparatus and a method for channel aggregation and single sideband transmission in a broadband communication system.

BACKGROUND

Channel aggregation (also known as link aggregation or channel bonding) refers to the combination of several transmission channels (physical lines, frequency bands, etc.) to form a single logical connection that is visible to the user. Channel aggregation has become a very useful mechanism for accommodating growing bandwidth requirements for wireless data transmission, e.g. for virtual-reality helmets or glasses requiring the transmission of several video and audio signals. Channel aggregation is commonly used in IEEE 802.11 implementations in which two or more adjacent channels within a given frequency band are combined to increase data throughput between two or more wireless devices. Specifically, each baseband channel is converted to a different carrier frequency that fits within the given frequency band.

Communication systems frequently use single sideband (SSB) transmission with carrier suppression because it is a very efficient transmission method in terms of power consumption and spectral efficiency. As it will be explained further below with reference to FIG. 2 SSB transmission requires a phase shift of the input signal that is upconverted to a higher frequency for transmission. The phase shift is typically performed with polyphase filters. However, the degree of phase shift caused by polyphase filters is also a function of the frequency of the signal to be shifted in phase. I.e. in case of a broadband signal such as a signal that is generated by channel aggregation, the phase shift may be 85° at a low end of the broadband signal spectrum and 95° at the upper end of the broadband signal spectrum resulting in a weak suppression of the undesired sideband. For such broadband signals the performance of SSB is decreasing.

Dascurcu et al. [1] have already proven the concept of linking IQ-modulation and SSB as well as image rejection (IR) and IQ-demodulation. Dascuru at al. suggest converting the baseband channels to positive and negative center frequencies $f_{c,n}$ and $-f_{c,n}$, respectively. In order to perform the SSB transmission, the channel aggregation is also done twice, once with phase shift. The positive frequencies $f_{c,n}$ need a positive phase shift of 90° to be only converted to the upper side band, while the negative frequencies $-f_{c,n}$ require a negative phase shift of −90° to be converted to the lower side band, respectively. In [1] the phases for the SSB and IR are generated using a Harmonic Rejection Mixer (HRM), which generates $f_{c,n}$ as harmonics of a divided frequency generated by a local oscillator (LO). The approach proposed in [1] using the HRM to generate $f_{c,n}$ and performing SSB RF conversion into the upper side band for positive $f_{c,n}$ and the lower side band for negative $-f_{c,n}$ is hard to scale for applications with a high number of channels.

S. Ahasan et al. [2] describe that for an harmonic reject mixer the LO phases required for the $f_{c,n}$ generation scales with the number of channels n as 2×n. This means that, for example, a 4-channel system requires 8 phases, an 8-channel system requires 16 phases, and so on, making the frequency generation circuitry much more difficult. Another aspect to be highlighted is that the generation of many frequencies implies the creation of an LO signal with a duty cycle (DC) scaling with 1/n, meaning 25% DC for 4 channels or 12.5% DC for 8 channels. The generation of pulsed LO signals is a challenge, when approaching small DCs and high LO frequencies.

In EP 1 264 424 B1 an interleaving apparatus for optical SSB transmission is disclosed. The proposed design is not capable of transmitting complex signals since the complex information is deleted in the SSB conversion.

Taking this as a starting point there remains a need for a method and a system for channel aggregation and SSB transmission that can be scaled when large numbers of channels need to be aggregated.

BRIEF SUMMARY

According to a first aspect the present disclosure suggests a method for channel aggregation and single sideband transmission executed in a broad-band communication system, wherein the method comprises:
receiving multiple digital bit streams forming N baseband signals, wherein N is an integer equal or greater than 1;
separating each one of the N baseband signals into a pair of split bit streams;
performing in a first channel bonder an IQ modulation utilizing the split bit streams and an output of first local oscillators as input signals for the IQ modulation to generate for each baseband signal N upconverted intermediate frequency signals with different individual center frequencies generated by the first local oscillators;
aggregating the N intermediate frequency signals in the first channel bonder to form a first intermediate frequency broadband signal;
performing in a second channel bonder an IQ modulation utilizing the split bit streams and an output of second local oscillators as input signals for the IQ modulation to generate for each baseband signal N upconverted intermediate frequency signals with different individual center frequencies generated by the second local oscillators, wherein the second local oscillators output the same center frequencies for each base band signal as the first local oscillators in the first channel bonder but shifted by 90° or by −90°;
aggregating the upconverted intermediate frequency signals in the second channel bonder to form a second intermediate frequency broadband signal, which is phase shifted by 90° or by −90° Compared with the first intermediate frequency broadband signal; and
providing the first and second intermediate frequency broadband signals as input signals for a single sideband transmitter generating a transmission signal.

According to the proposed method only I and Q versions of a purely sinusoidal intermediate frequency signals are needed as local oscillators, considerably easing the system scaling when large numbers of channels must be aggregated. In addition to that, instead of phase shifting of an intermediate frequency broadband signal rather two intermediate frequency broadband signals are generated, which are phase shifted by +90° or by −90°. As a result, the problems of frequency dependent phase shifting explained in the background section is not relevant for the method according to the present disclosure. In the proposed method, the first conversion is performed as a double-sideband (DSB) conversion, allowing the transmission of complex signals in contrast to the design shown in EP 1 264 424 B1, which is not capable of transmitting such complex signals since the complex information is deleted in the SSB conversion. After the channel aggregation, a SSB conversion is performed improving spectral efficiency, while maintaining the necessary information for complex modulation schemes.

According to an advantageous embodiment the method further comprises providing each pair of split bit streams associated with one baseband signal to one of the IQ modulators of the first channel bonder and to one IQ modulator of the second channel bonder.

It has been found useful to aggregate the upconverted intermediate frequency channels by adding them.

According to a second aspect the present disclosure suggests a corresponding method for image reject reception and channel separation executed in a broadband communication system, wherein the method comprises:
  receiving a single side band transmission signal containing N radio frequency channels, wherein N is an integer equal or greater than 1;
  downconverting the transmission signal into a first and a second intermediate frequency broadband signals, wherein the intermediate frequency signals are frequency interleaved broadband signals, and wherein the second intermediate frequency signal is phase shifted by 90° or −90° relative to the first intermediate frequency broadband signal;
  performing in a first channel debonder N IQ demodulations and a separation of the first intermediate frequency broadband signal into N baseband IQ signal pairs, wherein each downconverter uses a different local oscillator frequency;
  performing in a second channel debonder N IQ demodulations and a separation of the second intermediate frequency broadband signal into N baseband IQ signal pairs, where-in each downconverter uses the same local oscillator frequencies used in the first channel debonder but shifted by 90° or −90°; and
  superposing the downconverted baseband IQ signal pairs at the output of the first and second channel debonder to generate the I and Q component of all N baseband channels and deleting their images.

According to a third aspect the present disclosure suggests a transmitter comprising a first and a second channel bonder and a single sideband transmitter for transmitting N baseband signals. The first channel bonder comprises N IQ modulators. Each IQ modulator comprises a first local oscillator for upconverting each baseband signal to an individual intermediate frequency signal defined by the frequency of the local oscillator of the corresponding IQ modulator. The first channel bonder further comprises an adder for superposing the intermediate frequency signals of all IQ modulators to perform channel aggregation and to generate a first intermediate frequency broadband signal.

The second channel bonder comprises N IQ modulators. Each IQ modulator comprises a second local oscillator for upconverting each baseband signal to an individual intermediate frequency signal defined by the frequency of the local oscillator of the corresponding IQ modulator. The second local oscillators output the same center frequencies for each base band signal as the first local oscillators in the first channel bonder but shifted by 90° or by −90°. The second channel bonder further comprises an adder for superposing the intermediate frequency signals of all IQ modulators to perform channel aggregation to generate a second intermediate frequency broadband signal.

The single sideband transmitter comprises a local oscillator and mixers utilizing the first and second intermediate frequency broadband signals to generate a transmission signal.

According to a fourth aspect the present disclosure suggests a receiver comprising a first and a second channel debonder and an image reject receiver for receiving a transmission signals.

The image reject receiver comprises a local oscillator and mixers utilizing the transmission signal to generate a first and a second intermediate frequency broadband signal having the same frequency but are phase shifted by 90° or −90°. The first and second intermediate frequency broadband signal contain N baseband signals having individual center frequencies.

The first channel debonder comprises N IQ demodulators. Each IQ demodulator comprises mixers and a first local oscillator oscillating at the center frequency of one of the N baseband signals for downconverting the first intermediate frequency broadband signal into baseband signals.

The second channel debonder comprises N IQ demodulators. Each IQ demodulator comprises mixers and a second local oscillator oscillating at the center frequency of one of the N baseband signals for downconverting the second intermediate frequency broadband signal into baseband signals. The second local oscillators output the same center frequencies for each baseband signal as the first local oscillators in the first channel debonder but shifted by 90° or by −90°.

The receiver further comprises adders for superposing the respective I/Q baseband pairs provided by the first and second channel debonder to perform image rejection.

Finally, the present disclosure suggests according to a fifth aspect a communication system comprising a transmitter according to the third aspect and a receiver according to the fourth aspect of the present disclosure.

The method for image reject reception, single side transmission, channel aggregation and channel separation, the transmitter, the receiver and the system according to the second to fifth aspect of the present disclosure are conceived to realize the same advantages that have been mentioned in connection with the method for channel aggregation, disaggregation, image reject reception and single sideband transmission. In particular, the embodiments of the present disclosure are scalable proportional to the number of baseband signals that are to be transmitted or received without over proportionally increasing the complexity of the embodiments.

BRIEF DESCRIPTION OF THE DRAWINGS

Exemplary embodiments of the present disclosure are illustrated in the drawings and are explained in more detail in the following description. In the figures, the same or similar elements are referenced with the same or similar reference signs. It shows.

In the figures the same or similar components are labelled with the same or similar reference signs. The direction of signal transmission is indicated in the figures with arrows.

DETAILED DESCRIPTION

In the following an embodiment for a frequency interleaving N-channel transmitter, receiver and system are described. Furthermore, a method for channel aggregation, disaggregation, image reject reception and single sideband transmission (SSB) is disclosed. In the following description the words "signal" and "channel" are used synonymously.

a) IQ Modulator and Channel Aggregation

As explained in the background section, there is a growing need for bandwidth for data transmission and wireless applications, e.g. for virtual-reality (VR) applications such as VR helmets and glasses, in which multiple video and/or audio streams are provided as digital bit streams. For transmission the bit streams are modulated for instance by QAM modulation or IQ modulation allowing a high data throughput.

Figure 1A:
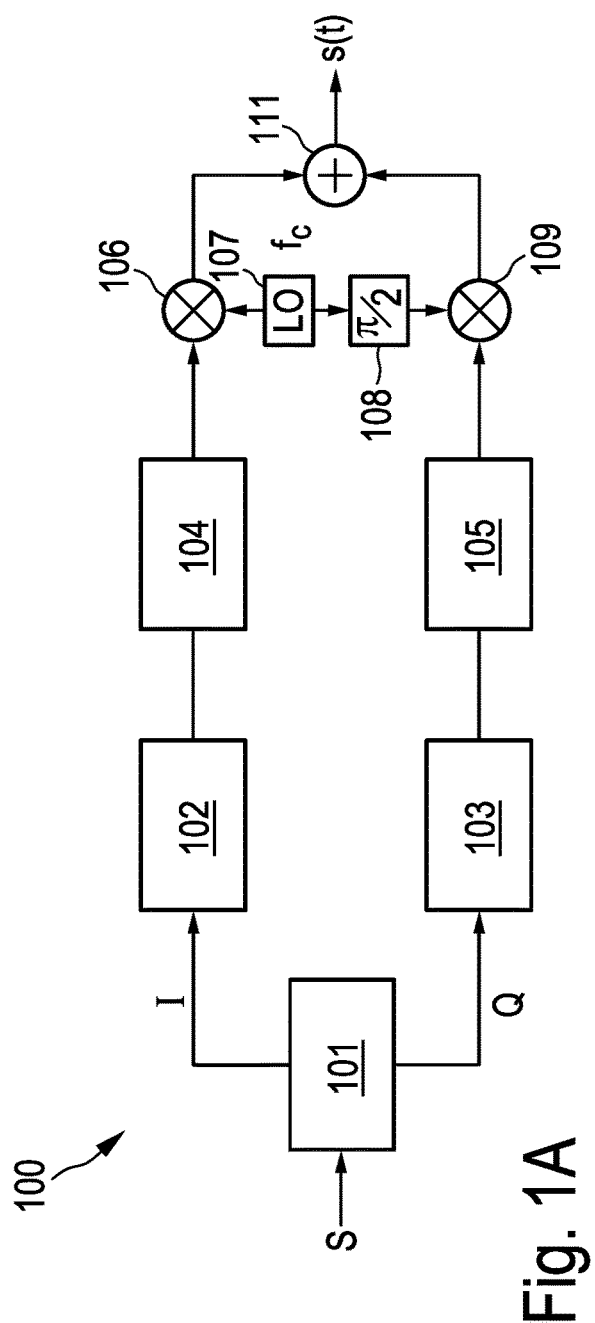
FIG. 1A a schematic block diagram of an IQ modulator.
Figure 1B:
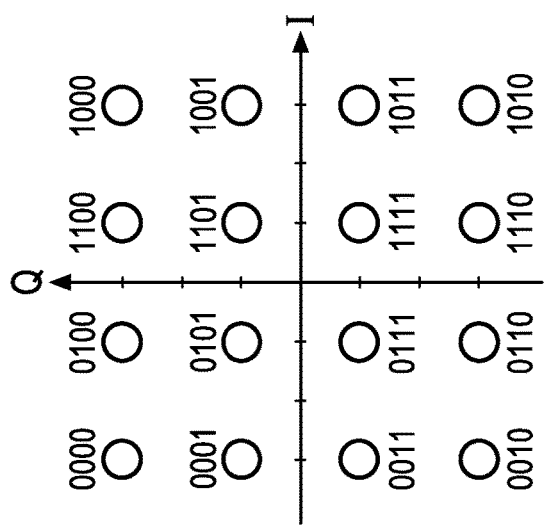
FIG. 1B a constellation diagram for I and Q values.

FIG. 1A illustrates a schematic block diagram of an IQ modulator 100 for modulating an incoming digital data input stream S. The data input stream S is provided by a data source (not shown), for instance the output of a camera or video replay device. In a flow splitter 101 the input stream S is divided into two split streams I, Q, each one having a data rate which is only half of the data rate of the input stream S. Each split streams I, Q is received by an impulse generator 102, 103 which assigns a predefined number of bits and their pattern to a certain amplitude level of an output signal. For instance, in case of a 16 QAM modulation the impulse generators 102, 103 output four different amplitude levels, namely −3, −1, 1, and 3. These amplitude levels directly correspond to the levels of the I and Q values in the constellation diagram shown in FIG. 1B. The output signals of the impulse generators 102, 103 pass through pulse formers 104, 105 to obtain a smooth waveform of the I and Q components. The I component is multiplied in a mixer 106 with the output signal of a local oscillator (LO) 107 having a frequency of $f_c$. The output signal of L0 107 is also provided to a phase shifter 108. The phase shifted signal of the L0 107 is multiplied with the Q component in a mixer 109. The output signals of mixers 106 and 109 are summed up in an adder 111 which generates an analogue output signal s(t) oscillating with a center frequency $f_c$ that corresponds to the frequency of the L0 107 signal.

The input signal S may represent one baseband (BB) signal (also referred to as baseband channel) of a broadband application that requires several baseband signals to be transmitted to obtain a bandwidth that is necessary for the broadband application. In this case one dedicated IQ modulator 100 is assigned to each one of the required baseband signals to generate an intermediate frequency (IF) modulated signal (briefly IF signal). The center frequency of the IF signal is selectable by choosing the frequency of the output signal of the LO 107 of the corresponding IQ modulator 100. In order to allow for channel aggregation of the IF signals, it is advantageous to operate the L0s 107 at different center frequencies $f_c$ such that the IF signals of different baseband channels do not overlap in the frequency domain. This objective is obtained by converting the modulated signals s(t) to a channel specific center frequency $f_{c,n}$.

b) Single Sideband Transmission

Figure 2:
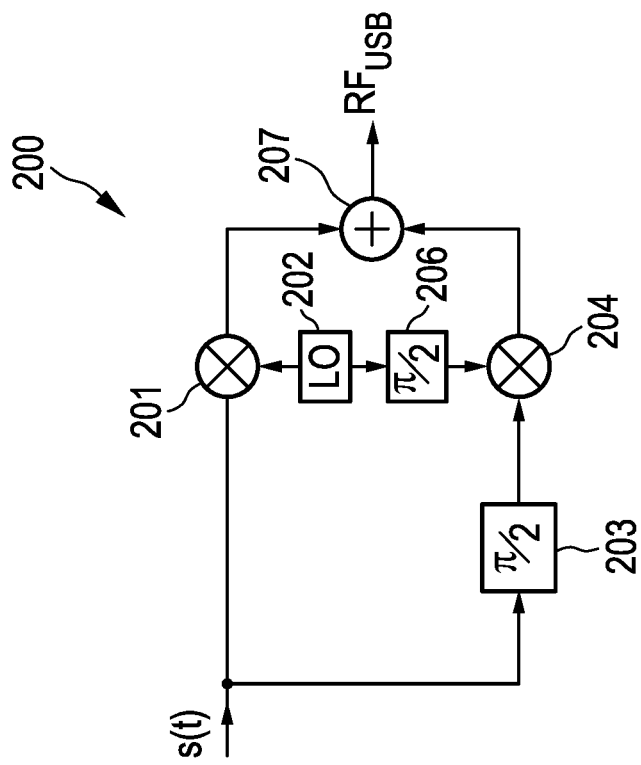
FIG. 2 an architecture of a conventional SSB transmitter.

Single sideband (SSB) transmission involves, firstly, upconversion of the modulated signal to a higher transmission frequency and, secondly, carrier suppression. SSB transmission is an efficient method in terms of power and spectrum consumption. FIG. 2 shows an architecture of a conventional SSB transmitter 200. An input signal s(t) that is to be transmitted is multiplied in a mixer 201 with an output signal of an LO 202. The input signal s(t) of SSB transmitter 200 is for example the modulated output signal s(t) of IQ modulator 100 shown in FIG. 1A. The input signal s(t) is also phase shifted by 90° in a phase shifter 203 and provided to a mixer 204. The mixer 204 receives as a second input signal a version of the output signal of the LO 202 that is phase shifted by 90° in a phase shifter 206. The output signals of mixers 201 and 204 are superposed in an adder 207 to obtain an upconverted transmission signal $RF_{USB}$ that only contains an upper sideband (USB) of the mixed output signals of the multipliers 201, 204. If the phase shift introduced by the phase shifters 203, 206 is −90° instead of 90°, the output of the adder 204 is the lower sideband signal (LSB) of the mixed signals.

The 90° phase shift of the output signal of the local oscillator 202 is easy to achieve because the output signal of the L0 202 is a single tone signal. However, if the input signal s(t) for the SSB transmitter 200 is a broadband signal covering a wide frequency range of several tenths of MHz, it is difficult to achieve a phase shift of precisely 90° throughout the full spectrum of the broadband signal because the phase shift of polyphase filters, which are typically used as phase shifter 203, is frequency dependent and therefore the phase shift at the low and high end of the spectrum of the broadband signal is different, for instance 85° and 95°. Unfortunately, every deviation from a 90° phase shift leads to a weak suppression of the undesired sideband (and, thus, results in a degraded performance of the SSB transmitter 200).

c) IQ-Modulation and SSB Frequency Interleaving Architecture

For the reasons laid out in the background section, the present disclosure suggests a new concept for channel aggregation and SSB transmission. For the sake of simplicity, the concept will be explained in a first step by means of an embodiment of the new architecture shown in FIG. 3 which utilizes only two baseband channels. However, the architecture can be scaled to applications with more than two baseband channels.

Figure 3:
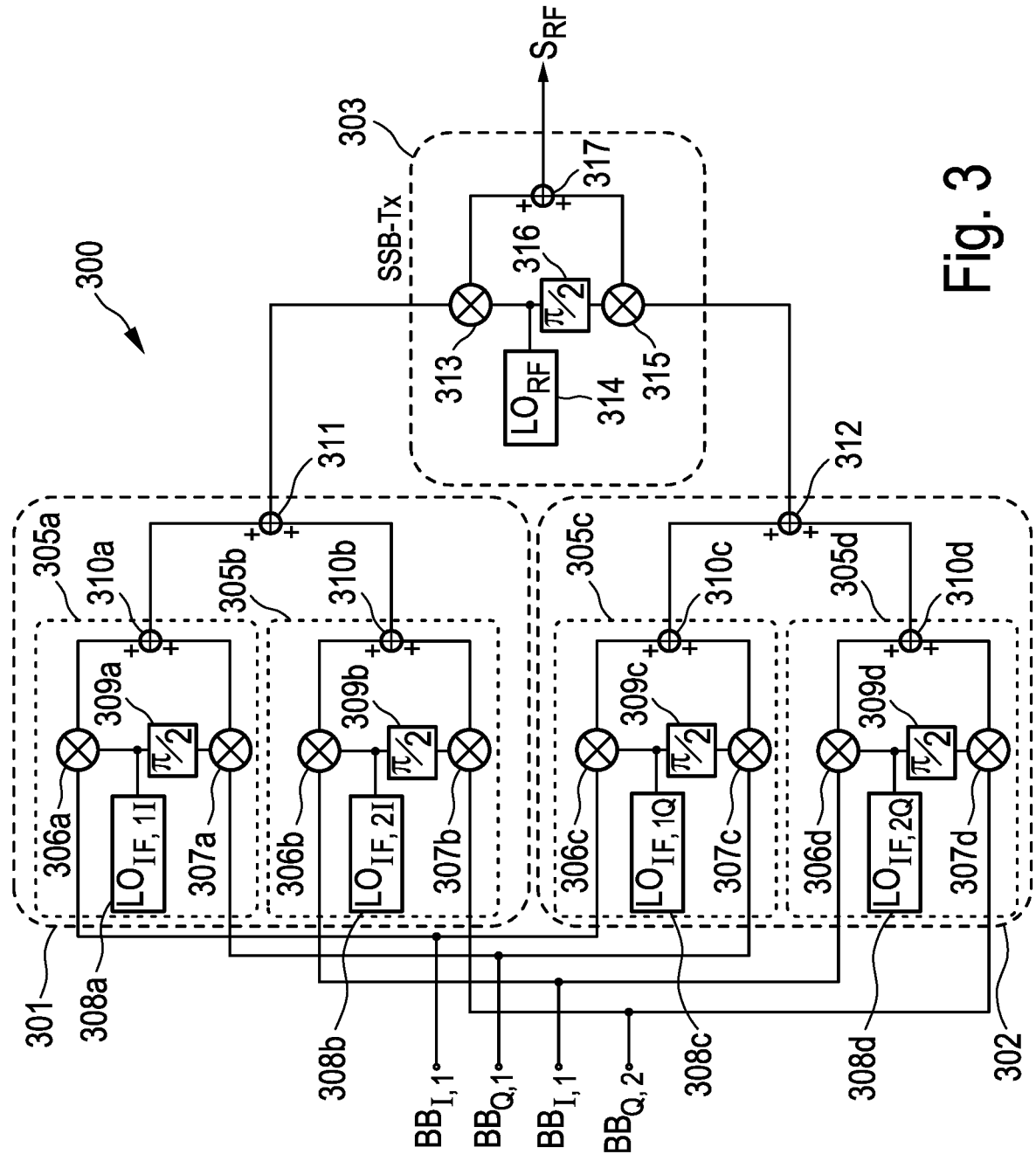
FIG. 3 a schematic block diagram of a transmitter device for two baseband channels.

FIG. 3 illustrates a transmitter device 300 for two baseband channels $BB_1$, $BB_2$, which are separated into two split streams denominated as $BB_{I,1}$ and $BB_{Q,1}$ for baseband channel $BB_1$ and $BB_{I,2}$ and $BB_{Q,2}$ for baseband channel $BB_2$. The transmitter device 300 comprises a 0°-channel-bonder 301, a 90°-channel-bonder 302, and a single sideband transmitter 303 as main components.

The 0°-channel-bonder 301 comprises two IQ modulators 305a, 305b to process the split streams $BB_{I,1}$, $BB_{Q,1}$, $BB_{I,2}$, and $BB_{Q,2}$. IQ modulator 305a comprises multipliers 306a, 307a, an LO 308a, a phase shifter 309a and an adder 310a. IQ modulator 305b comprises corresponding components labelled with corresponding reference signs. The output signals of IQ modulators 305a, 305b are summed in an adder 311.

The 90°-channel-bonder 302 comprises two IQ modulators 305c, 305d to process the split streams $BB_{I,1}$, $BB_{Q,1}$, $BB_{I,2}$, and $BB_{Q,2}$. IQ modulators 305c, 305d comprise corresponding components like IQ modulators 305a, 305b. The corresponding components are labelled with corresponding reference signs. The output signals of IQ modulators 305c, 305d are summed in an adder 312.

It is important to note that the LOs 308a-d of IQ modulators 305a-d output different signals as summarized for better overview in the following Table 1:

TABLE 1

| LO | Frequency | Phase |
| --- | --- | --- |
| 308a | IF1 | 0° |
| 308b | IF2 | 0° |
| 308c | IF1 | 90° |
| 308d | IF2 | 90° |

The frequencies −IF1 and IF2 of the local oscillators 308a-d are set such that the output of adder 311 provides the baseband channels $BB_1$ and $BB_2$ as frequency interleaved IF signals in which the baseband channels do not overlap in the frequency spectrum. The same is true for output signal of adder 312 which is identical to the output signal of adder 311 except for a phase shift by 90°. For that reason, it is possible to process the output signals of adders 311, 312 without any further phase shift in the single sideband transmitter 303. Advantageously, the phase shifted IF signals provided by the 0°- and 90°-channel-bonders 301, 302 are generated by phase shifting of the single tone signals of the LOs 308c, 308d versus the LOs 308a, 308b as shown in Table 1. In this way the problem of frequency dependent phase shifts, which is inherent when broadband signals are phase-shifted, is effectively avoided.

The SSB transmitter 303 receives as a first input signal for mixer 313 the frequency interleaved output signal of adder 311. A further input signal for mixer 313 is an output signal of LO 314 oscillating at a transmission frequency $f_{RF}$.

The SSB transmitter 303 receives as a second input signal for mixer 315 the frequency interleaved output signal of adder 312. A further input signal for mixer 315 is a phase-shifted version of the output signal of LO 314, which is phase shifted by 90° by phase shifter 316. The output signals of multipliers of 313, 315 are superposed in adder 317 that provides an SSB transmission signal or transmission channel.

Figure 4:
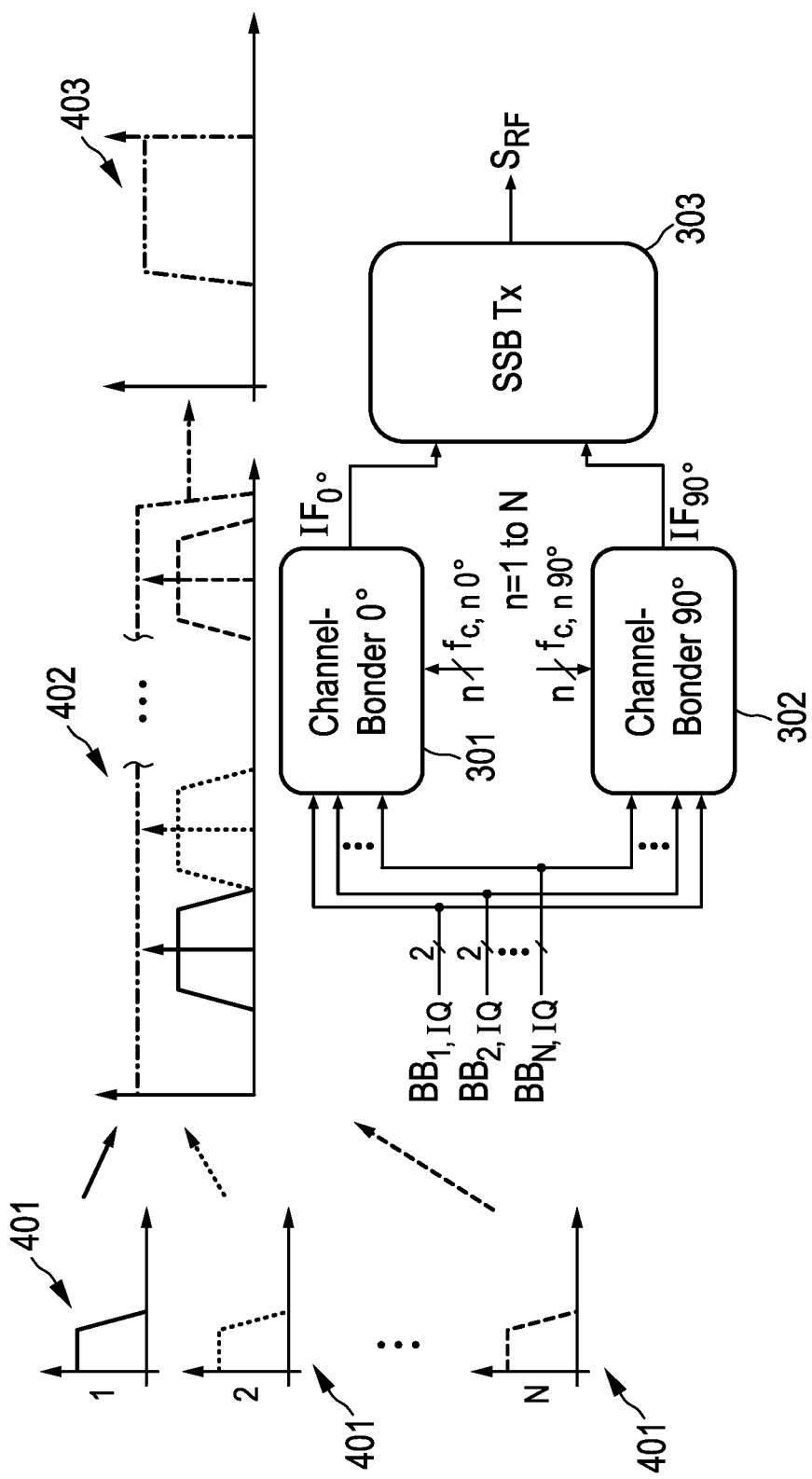
FIG. 4 a schematic diagram of the concept of frequency interleaved channel aggregation with subsequent SSB transmission for N baseband channels.

FIG. 4 displays a schematic diagram illustrating on a high level of abstraction the concept of frequency interleaved channel aggregation with subsequent SSB transmission for N baseband channels, wherein N is a natural number larger than 1. The baseband channels are symbolized in FIG. 4 as N spectrum diagrams 401. The baseband channels are received by the 0°-channel-bonder 301 and the 90°-channel-bonder 302 forming an IF channel IF0° and IF90°, respectively, by frequency interleaving and aggregating the baseband channels. The IF channel is symbolized by a frequency spectrum 402 that contains the baseband channels 1 to N at different center frequencies. As described in the previous section, the IF channel IF0° provided by the 0°-channel-bonder 301 and the IF channel IF 90° provided by the 90°-channel-bonder are shifted by 90° to each other. Based on the two IF channels IF0° and IF90° the SSB transmitter 303 generates an upconverted transmission signal $S_{RF}$ or transmission channel, which is symbolized as frequency spectrum 403. The transmission signal $S_{RF}$ has for instance a frequency in the gigahertz range e.g. around 2.4 GHz or 5 GHz.

d) Image Rejection and Channel Separation

Figure 5:
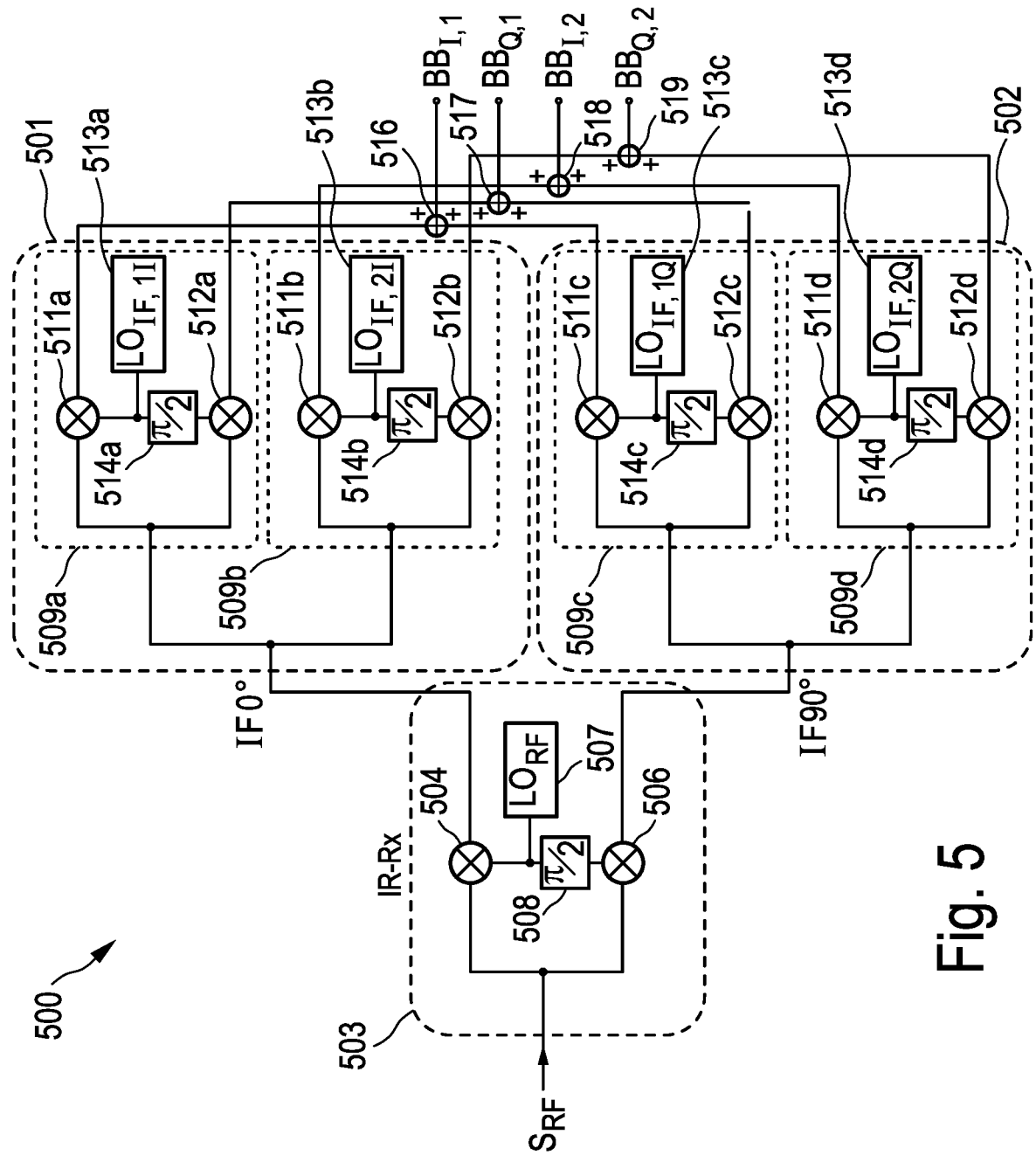
FIG. 5 a schematic block diagram of a receiver device 500 with channel separation.

FIG. 5 shows a schematic block diagram of a receiver device 500 with channel separation according to the present disclosure. The main components of the receiver device 500 are in an image reject (IR) receiver 503, a 0°-channel-debonder 501 and a 90°-channel-debonder 502. The transmission signal $S_{RF}$ is received by IR receiver 503 and provided to mixers 504, 506. In mixer 504 the transmission signal $S_{RF}$ is multiplied with an output signal of LO 507 to downconvert the transmission signal $S_{RF}$ to an IF0° signal provided to the 0°-channel-debonder 501. In mixer 506 the transmission signal $S_{RF}$ is multiplied with the phase shifted version of the output signal of LO 507 that is phase shifted by 90° in phase shifter 508. The mixer 506 outputs an intermediate frequency signal IF90° to 90°-channel-debonder 502. The IF0° and IF90° signals are frequency interleaved broadband signals wherein the IF90° signal is phase shifted by 90° Compared to the IF0° signal. The IF0° signal is provided to the 0°-channel-debonder 501 and the IF90° signal is provided to 90°-channel-debonder 502.

0°-channel-debonder 501 comprises two IQ demodulators 509a, 509b. The IQ demodulator 509a includes mixers 511a, 512a receiving the IF0° signal as a first input signal. An output signal of LO 513a is a second input signal for mixer 511a. A version of output signal of LO 513a phase shifted by 90° in phase shifter 514a is a second input signal for mixer 512a.

IQ demodulator 509b is similarly structured. The same applies to IQ demodulators 509c, 509d forming the 90°-channel-debonder 502. The 0°-channel-debonder 501 and the 90°-channel-debonder 502 output baseband IQ signal pairs, which contain the information of the baseband channels including the image signals shifted by 180°.

The main difference between the IQ demodulator's 509a-d are different oscillation frequencies and phases of the LOs 513a-d. The differences are summarized for better overview in the following Table 2:

TABLE 2

| LO | Frequency | Phase |
| --- | --- | --- |
| 513a | IF1 | 0° |
| 513b | IF2 | 0° |
| 513c | IF1 | 90° |
| 513d | IF2 | 90° |

With reference to FIG. 5 it can be seen that the output signals of mixers 511a and 511c are superposed in adder 516 generating the analogue I component $BB_{I,1}$ of baseband signal $BB_1$ by constructive interference, and deleting their images by destructive interference. The output signals of multipliers 512a and 512c are superposed in adder 517 generating the analogue Q component $BB_{Q,1}$ of baseband signal $BB_1$ by constructive interference, and deleting their images by destructive interference. The output signals of 511b and 511d are superposed in adder 518 generating the analogue $BB_{I,2}$ component of baseband signal $BB_2$ by constructive interference, and deleting their images by destructive interference. Finally, the output signals of 512b and 512d are superposed in adder 519 generating the analogue Q component $BB_{Q,2}$ of baseband signal $BB_2$ by constructive interference, and deleting their images by destructive interference. By subsequent analogue to digital conversion (not shown in FIG. 5) it is possible to reconstruct the original digital baseband signals $BB_1$ and $BB_2$.

The transmitter device 300 and receiver device 500 shown in FIGS. 3 and 5 are scalable for multiple baseband signals without departing from the working principle described in an embodiment for two baseband signals. It is noted that the combination of the transmitter device 300 and the receiver device 500 forms a communication system.

Figure 6:
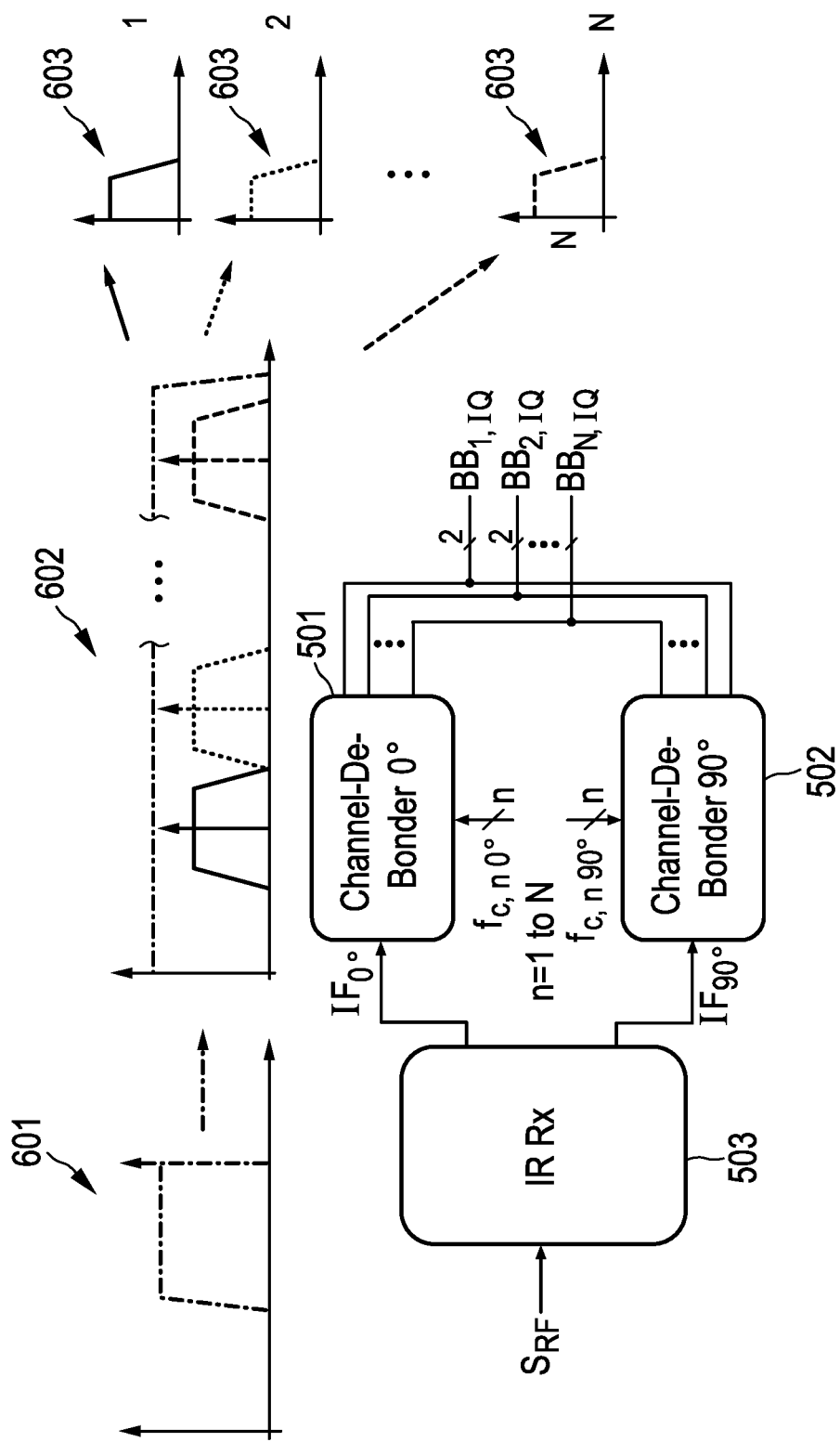
FIG. 6 a schematic diagram on a high level of abstraction the concept of image rejection and channel separation for N baseband channels.

FIG. 6 displays a schematic diagram on a high level of abstraction the concept of image rejection and channel separation for N baseband channels, wherein N is a natural number larger than 1. The transmission channel $S_{RF}$ is symbolized by a frequency spectrum 601. The transmission channel $S_{RF}$ is received by IR receiver 503 generating the intermediate frequency broadband signals IF0° and IF90° provided to 0°-channel-debonder 501 and 90°-channel-debonder 502, respectively. The IF0° and IF90° signals contain the aggregated baseband signals at different center frequencies $f_{c,n}$ as symbolized by frequency spectrum 602. As it has been described in connection with FIG. 5 the baseband signals symbolized by frequency spectrums 603 are reconstructed by the channel debonders 501, 502.

Figure 7:
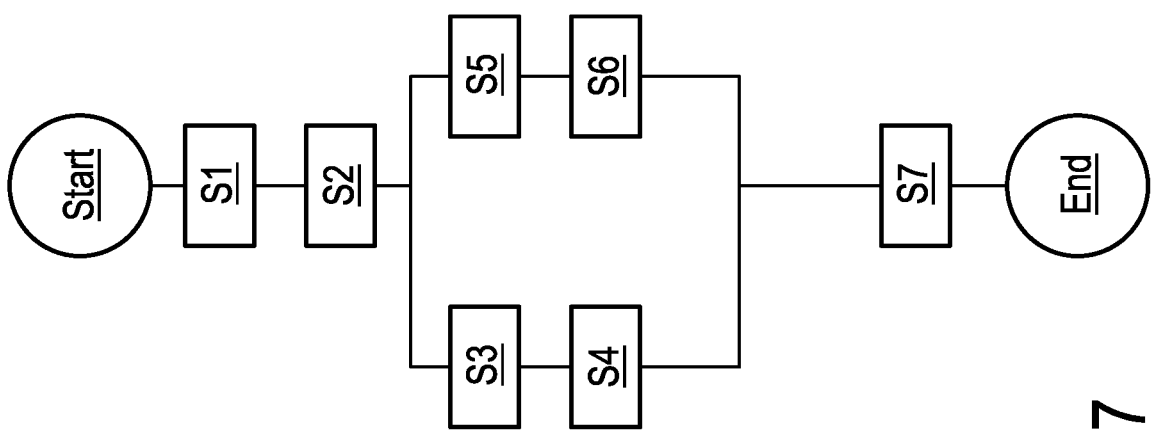
FIG. 7 a schematic flow diagram of the method for channel aggregation and single sideband transmission.

FIG. 7 illustrates a schematic flow diagram of the method for channel aggregation and single sideband transmission. Step S1 relates to receiving multiple digital bit streams forming N baseband signals. In step S2 each one of the N baseband signals is separated into a pair of split bit streams I, Q. In a first channel bonder an IQ modulation is performed (step S3) utilizing the split bit streams and an output of first local oscillators as input signals for the IQ modulation to generate for each baseband signal N upconverted intermediate frequency signals with different individual center frequencies generated by the first local oscillators. The N intermediate frequency signals are aggregated in the first channel bonder to form a first intermediate frequency broadband signal (step S4). In a second channel bonder an IQ modulation is performed (step S5) utilizing the split bit streams and an output of second local oscillators as input signals for the IQ modulation to generate for each baseband signal N upconverted intermediate frequency signals with different individual center frequencies generated by the second local oscillators, wherein the second local oscillators output the same center frequencies for each base band signal as the first local oscillators in the first channel bonder but shifted by 90° or by −90°. Then the upconverted intermediate frequency signals in the second channel bonder are aggregated (step S6) to form a second intermediate frequency broadband signal, which is phase shifted by 90° or by −90° Compared with the first intermediate frequency broadband signal. It is noted that steps S5 and S6 are performed in parallel to steps S3 and S4. Finally, the first and second intermediate frequency broadband signals are provided (step S7) as input signals for a single sideband transmitter generating a transmission signal.

Figure 8:
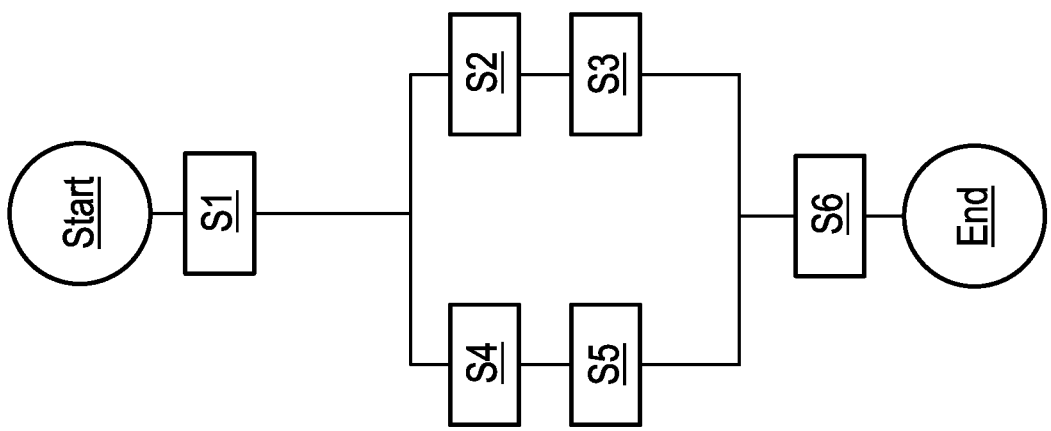
FIG. 8 a schematic flow diagram of the method for image reject reception and channel separation.

FIG. 8 exhibits a schematic flow diagram of the method for single side band reception and channel separation. Firstly, the transmission signal containing N baseband signals is received (step S1). The transmission signal is downconverted (step S2) into a first and a second intermediate frequency broadband signal, wherein the intermediate frequency signals are frequency interleaved broadband signals, and wherein the second intermediate frequency signal is phase shifted by 90° or −90° relative to the first intermediate frequency broadband signal. In a first channel debonder an IQ demodulation and separation into N downconverted signals of the first intermediate frequency broadband signal is performed (step S3), wherein each downconverter uses a different center frequency. In a second channel debonder an IQ demodulation and separation into N downconverted signals of the second intermediate frequency broadband signal is performed (step S4), wherein each downconverter uses the same center frequency than the corresponding downconverter of the first channel debonder. Finally, the downconverted output signals of the first and second channel debonder are superposed (step S6) to generate the I and Q component of all N baseband signals and reject their images. It is noted that steps S4 and S5 are performed in parallel to steps S2 and S3.

CITED LITERATURE

[1] A. Dascurcu, S. Ahasan, A. Binaie, K. J. Lu, A. Natarajan and H. Krishnaswamy, "A 60 GHz Phased Array Transceiver Chipset in 45 nm RF SOI Featuring Channel Aggregation Using HRM-Based Frequency Interleaving," 2022 IEEE Radio Frequency Integrated Circuits Symposium (RFIC), 2022, pp. 67-70, doi: 10.1109/RFIC54546.2022.9863112.

[2] S. Ahasan et al., "Frequency-Domain-Multiplexing Single-Wire Interface and Harmonic-Rejection-Based IF Data De-Multiplexing in Millimeter-Wave MIMO Arrays," in IEEE Journal of Solid-State Circuits, vol. 56, no. 5, pp. 1360-1373 May 2021, doi: 10.1109/JSSC.2021.3066207.

What is claimed is:

1. A method for channel aggregation and single sideband transmission executed in a broadband communication system, wherein the method comprises:
   receiving multiple digital bit streams forming N baseband signals, wherein N is an integer equal to or greater than 1;
   separating each one of the N baseband signals into a pair of split bit streams;
   performing in a first channel bonder an IQ modulation utilizing the split bit streams and an output of first local oscillators as input signals for the IQ modulation to generate for each baseband signal N upconverted intermediate frequency signals with different individual center frequencies generated by the first local oscillators;
   aggregating the N upconverted intermediate frequency signals in the first channel bonder to form a first intermediate frequency broadband signal;
   performing in a second channel bonder an IQ modulation utilizing the split bit streams and an output of second local oscillators as input signals for the IQ modulation to generate for each baseband signal N upconverted intermediate frequency signals with different individual center frequencies generated by the second local oscillators, wherein the second local oscillators output the same center frequencies for each base band signal as the first local oscillators in the first channel bonder but shifted by 90° or by −90°;
   aggregating the N upconverted intermediate frequency signals in the second channel bonder to form a second intermediate frequency broadband signal, which is phase shifted by 90° or by −90° compared with the first intermediate frequency broadband signal; and
   providing the first and second intermediate frequency broadband signals as input signals for a single sideband transmitter generating a transmission signal.

2. The method according to claim 1, wherein the method further comprises:

providing each pair of split bit streams associated with one baseband signal to one IQ modulator of the first channel bonder and to one IQ modulator of the second channel bonder.

3. The method according to claim 1, wherein aggregating the N upconverted intermediate frequency signals is performed by adding these signals.

4. A method for image reject reception and channel separation executed in a broadband communication system, wherein the method comprises:
receiving a single sideband transmission signal containing N radio frequency channels, wherein N is an integer equal to or greater than 1;
downconverting the transmission signal into a first intermediate frequency broadband signal and a second intermediate frequency broadband signal, wherein the first and second intermediate frequency broadband signals are frequency interleaved broadband signals, and wherein the second intermediate frequency signal is phase shifted by 90° or −90° relative to the first intermediate frequency broadband signal;
performing in a first channel debonder N IQ demodulations and a separation of the first intermediate frequency broadband signal into N baseband IQ signal pairs, wherein each downconverter uses a different local oscillator frequency;
performing in a second channel debonder N IQ demodulations and a separation of the second intermediate frequency broadband signal into N baseband IQ signal pairs, wherein each demodulator uses the same local oscillator frequencies used in the first channel debonder but shifted by 90° or by −90°; and
superposing the downconverted baseband IQ signal pairs at the output of the first and second channel debonders to generate the I and Q component of all N baseband channels and deleting their images.

5. A transmitter comprising:
a first channel bonder;
a second channel bonder; and
a single sideband transmitter for transmitting N baseband signals,
wherein the first channel bonder comprises N IQ modulators, wherein each IQ modulator comprises a first local oscillator for upconverting each baseband signal to an individual intermediate frequency signal defined by the frequency of the local oscillator of the corresponding IQ modulator, wherein the first channel bonder further comprises an adder for superposing the intermediate frequency signals of all IQ modulators to perform channel aggregation and to generate a first intermediate frequency broadband signal,
wherein the second channel bonder comprises N IQ modulators, wherein each IQ modulator comprises a second local oscillator for upconverting each baseband signal to an individual intermediate frequency signal defined by the frequency of the local oscillator of the corresponding IQ modulator, wherein the second local oscillators output the same center frequencies for each base band signal as the first local oscillators in the first channel bonder but shifted by 90° or by −90°, wherein the second channel bonder further comprises an adder for superposing the intermediate frequency signals of all IQ modulators to perform channel aggregation to generate a second intermediate frequency broadband signal, and
wherein the single sideband transmitter comprises a local oscillator and mixers utilizing the first and second intermediate frequency broadband signals to generate a transmission signal.

6. A receiver comprising:
a first channel debonder;
a second channel debonder; and
an image reject receiver for receiving a transmission signal,
wherein the image reject receiver comprises a local oscillator and mixers utilizing the transmission signal to generate a first intermediate frequency broadband signal and a second intermediate frequency broadband signal having the same frequency but are phase shifted by 90° or −90°, wherein the first and second intermediate frequency broadband signals contain N baseband signals having individual center frequencies,
wherein the first channel debonder comprises N IQ demodulators, wherein each IQ demodulator comprises mixers and a first local oscillator oscillating at the center frequency of one of the N baseband signals for downconverting the first intermediate frequency broadband signal into baseband signals,
wherein the second channel debonder comprises N IQ demodulators, wherein each IQ demodulator comprises mixers and a second local oscillator oscillating at the center frequency of one of the N baseband signals for downconverting the second intermediate frequency broadband signal into baseband signals, wherein the second local oscillators output the same center frequencies for each baseband signal as the first local oscillators in the first channel debonder but shifted by 90° or by −90°, and
wherein the receiver further comprises adders for superposing the baseband signals provided by the first and second channel debonders to generate I and Q components of the baseband signals and rejecting their images.

7. A communication system comprising a transmitter according to claim 5.

8. A communication system comprising a receiver according to claim 6.

* * * * *